(12) United States Patent
Uenaka et al.

(10) Patent No.: US 7,405,750 B2
(45) Date of Patent: Jul. 29, 2008

(54) POSITION-DETECTING APPARATUS

(75) Inventors: Yukio Uenaka, Tokyo (JP); Shuzo Seo, Saitama (JP)

(73) Assignee: Hoya Corporation, Tokyo (JP)

( * ) Notice: Subject to any disclaimer, the term of this patent is extended or adjusted under 35 U.S.C. 154(b) by 715 days.

(21) Appl. No.: 11/065,354

(22) Filed: Feb. 25, 2005

(65) Prior Publication Data

US 2005/0190267 A1 Sep. 1, 2005

(30) Foreign Application Priority Data

Feb. 27, 2004 (JP) ............................ P2004-053127

(51) Int. Cl.
*H04N 5/228* (2006.01)
(52) U.S. Cl. .................. 348/208.99; 396/55; 359/823
(58) Field of Classification Search ............ 348/208.99, 348/208.1, 208.2; 396/55; 359/823
See application file for complete search history.

(56) References Cited

U.S. PATENT DOCUMENTS

| | | | |
|---|---|---|---|
| 5,266,988 A * | 11/1993 | Washisu | 396/55 |
| 5,835,799 A * | 11/1998 | Washisu | 396/55 |
| 5,974,269 A * | 10/1999 | Sato et al. | 396/55 |
| 6,091,900 A * | 7/2000 | Kaneda et al. | 396/55 |
| 6,112,028 A * | 8/2000 | Okada | 396/55 |
| 6,631,042 B2 * | 10/2003 | Noguchi | 359/823 |
| 6,985,176 B2 * | 1/2006 | Noguchi | 348/208.11 |
| 6,992,700 B1 * | 1/2006 | Sato et al. | 348/208.2 |
| 7,307,653 B2 * | 12/2007 | Dutta | 348/208.7 |

2003/0067544 A1 4/2003 Wada

FOREIGN PATENT DOCUMENTS

| | | |
|---|---|---|
| JP | 10-142647 | 5/1998 |
| JP | 2002-229090 | 8/2002 |
| JP | 2003-110919 | 4/2003 |

OTHER PUBLICATIONS

U.S. Appl. No. 11/044,055 to Uenaka et al., which was filed on Jan. 28, 2005.

(Continued)

*Primary Examiner*—David Ometz
*Assistant Examiner*—Ahmed A Berhan
(74) *Attorney, Agent, or Firm*—Greenblum & Bernstein, P.L.C.

(57) ABSTRACT

An anti-shake apparatus of a photographing apparatus comprises a movable-unit and a fixed-unit. The movable-unit has an imaging-device and is movable in first and second directions. The fixed-unit slidably supports the movable-unit in both the first and second directions. The movable-unit has a horizontal hall-element for detecting a first location in the first direction of the movable-unit, and a vertical hall-element for detecting a second location in the second direction of the movable-unit. The fixed-unit has a magnet unit which is used for detecting the first and second locations, and which has first and second horizontal magnets and first and second vertical magnets. The polarities of the first and second horizontal magnets are arranged in opposite directions, in the third direction. N-pole of the first horizontal magnet and S-pole of the second horizontal magnet are separated in the first direction by a first distance, and face the horizontal hall-element.

15 Claims, 10 Drawing Sheets

OTHER PUBLICATIONS

U.S. Appl. No. 11/044,054 to Uenaka, which was filed on Jan. 28, 2005.
U.S. Appl. No. 11/065,577 to Uenaka, which was filed on Feb. 25, 2005.
U.S. Appl. No. 11/044,010 to Uenaka et al., which was filed on Jan. 28, 2005.
U.S. Appl. No. 11/073,638 to Uenaka et al., which was filed on Mar. 8, 2005.
U.S. Appl. No. 11/073,604 to Uenaka, which was filed on Mar. 8, 2005.
U.S. Appl. No. 11/071,234 to Uenaka, which was filed on Mar. 4, 2005.
U.S. Appl. No. 11/071,220 to Uenaka et al., which was filed on Mar. 4, 2005.
U.S. Appl. No. 11/071,241 to Uenaka, which was filed on Mar. 4, 2005.
U.S. Appl. No. 11/071,242 to Uenaka, which was filed on Mar. 4, 2005.
U.S. Appl. No. 11/078,367 to Seo, which was filed on Mar. 14, 2005.
English Language Abstract of JP 2002-229090, Aug. 14, 2002.
English Language Abstract of JP 2003-110919, Apr. 11, 2003.
English Language Abstract of JP 10-142647, May 29, 1998.

* cited by examiner

POSITION-DETECTING APPARATUS

BACKGROUND OF THE INVENTION

1. Field of the Invention

The present invention relates to an anti-shake apparatus for a photographing device (apparatus), and in particular to a position-detecting apparatus for a movable unit that includes the imaging device etc., and that can be moved for correcting the hand-shake effect.

2. Description of the Related Art

An anti-shake apparatus for a photographing apparatus is proposed. The anti-shake apparatus corrects for the hand-shake effect by moving a hand-shake correcting lens or an imaging device on a plane that is perpendicular to the optical axis, corresponding to the amount of hand-shake which occurs during imaging.

Japanese unexamined patent publication (KOKAI) No. 2002-229090 discloses an anti-shake apparatus for a photographing apparatus. The anti-shake apparatus performs a moving operation of a movable unit, which includes a hand-shake correcting lens, by using a permanent magnet and a coil, and a position-detecting operation of the movable unit, by using a hall element and a permanent magnet.

However, in this anti-shake apparatus, a range, where an accurate position-detecting operation can be performed based on the linear output-change (linearity) of the one-axis hall element, is not wide (about ±0.5 mm (1.0 mm) in one direction).

Accordingly, the movement range of the movable unit for the anti-shake operation, which is needed, and which corresponds to the range where an accurate position-detecting operation can be performed based on the linear output-change, is limited.

SUMMARY OF THE INVENTION

Therefore, an object of the present invention is to provide an apparatus that has a wide range for performing an accurate position-detecting operation based on the linear output-change, in an anti-shake apparatus which uses a magnetic-field change-detecting element for detecting position.

According to the present invention, an anti-shake apparatus of a photographing apparatus comprises a movable unit and a fixed unit.

The movable unit has one of an imaging device and a hand-shake correcting lens, and can be moved in first and second directions. The first direction is perpendicular to an optical axis of a photographing lens of the photographing apparatus. The second direction is perpendicular to the optical axis and the first direction.

The fixed unit slidably supports the movable unit in both the first and second directions.

One of the movable unit and the fixed unit has a magnetic-field change-detecting unit which has a horizontal magnetic-field change-detecting element for detecting a position of the movable unit in the first direction, as a first location, and a vertical magnetic-field change-detecting element for detecting a position of the movable unit in the second direction, as a second location.

Another of the movable unit and the fixed unit has a position-detecting magnet unit which is used for detecting the first and second locations, and which faces the magnetic-field change-detecting unit, and which has first and second horizontal position-detecting magnets and first and second vertical position-detecting magnets.

The N pole and S pole of the first horizontal position-detecting magnet are arranged in a third direction which is parallel to the optical axis and is perpendicular to the first and second directions.

The N pole and S pole of the second horizontal position-detecting magnet are arranged in the third direction.

The polarities of the first and second horizontal position-detecting magnets are arranged in opposite directions, in the third direction.

The N pole of said first horizontal position-detecting magnet and the S pole of the second horizontal position-detecting magnet are separated in the first direction by a first distance, and face the horizontal magnetic-field change-detecting element.

The first and second horizontal position-detecting magnets are used for detecting are first location.

The N pole and S pole of the first vertical position-detecting magnet are arranged in the third direction.

The N pole and S pole of the second vertical position-detecting magnet are arranged in the third direction.

The polarities of the first and second vertical position-detecting magnets are arranged in opposite directions, in the third direction.

The N pole of the first vertical position-detecting magnet and the S pole of the second vertical position-detecting magnet are separated in the second direction by a second distance, and face the vertical magnetic-field change-detecting element.

The first and second vertical position-detecting magnets are used for detecting the second location.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
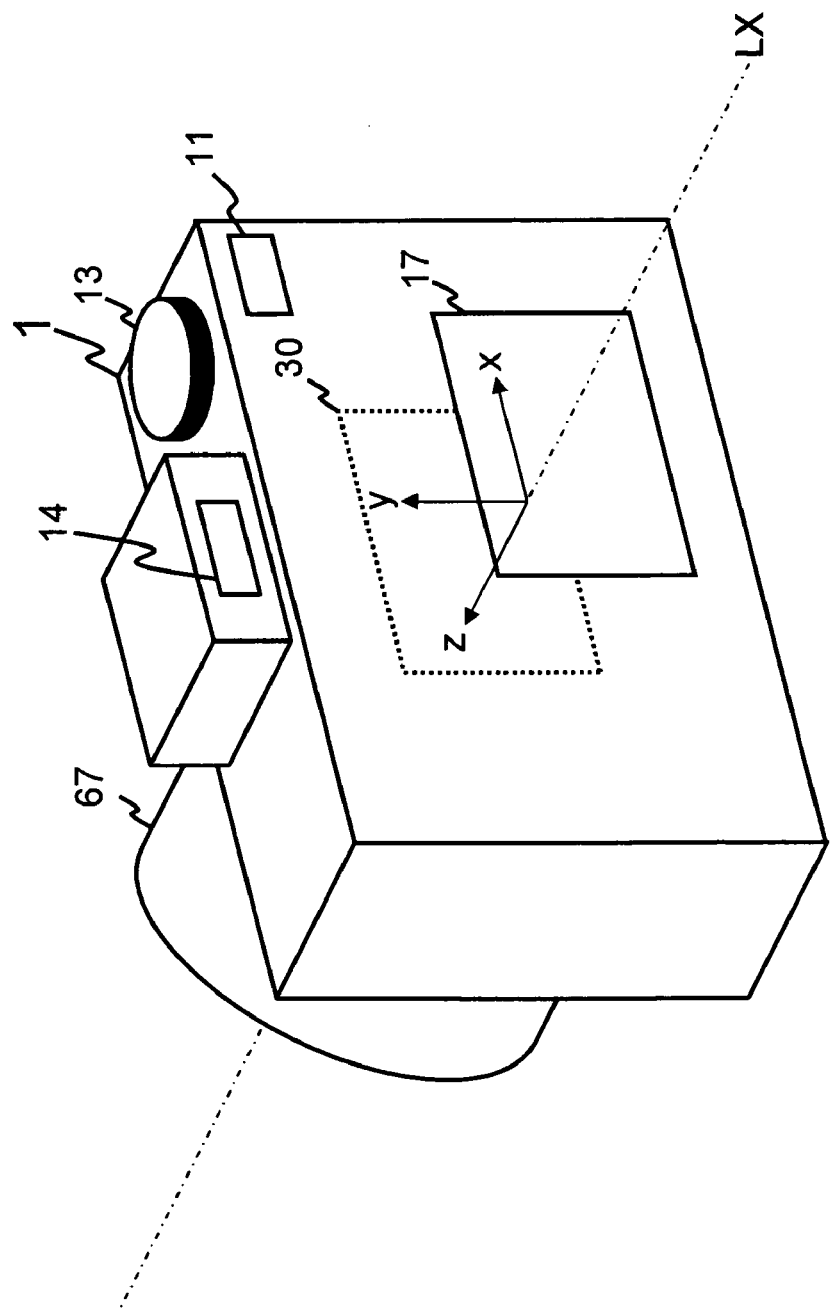
FIG. 1 is a perspective view of a photographing apparatus of the embodiment viewed from the back side of the photographing apparatus.

The present invention is described below with reference to the embodiments shown in the drawings. In this embodiment, the photographing device 1 is a digital camera. The photographing device 1 has an optical axis LX.

In order to explain the direction in this embodiment, a first direction x, a second direction y, and a third direction z are defined (see FIG. 1). The first direction x is a horizontal direction which is perpendicular to the optical axis LX. The second direction y is a vertical direction which is perpendicular to the optical axis LX and the first direction x. The third direction z is a horizontal direction which is parallel to the optical axis LX and perpendicular to both the first direction x and the second direction y.

Figure 4:
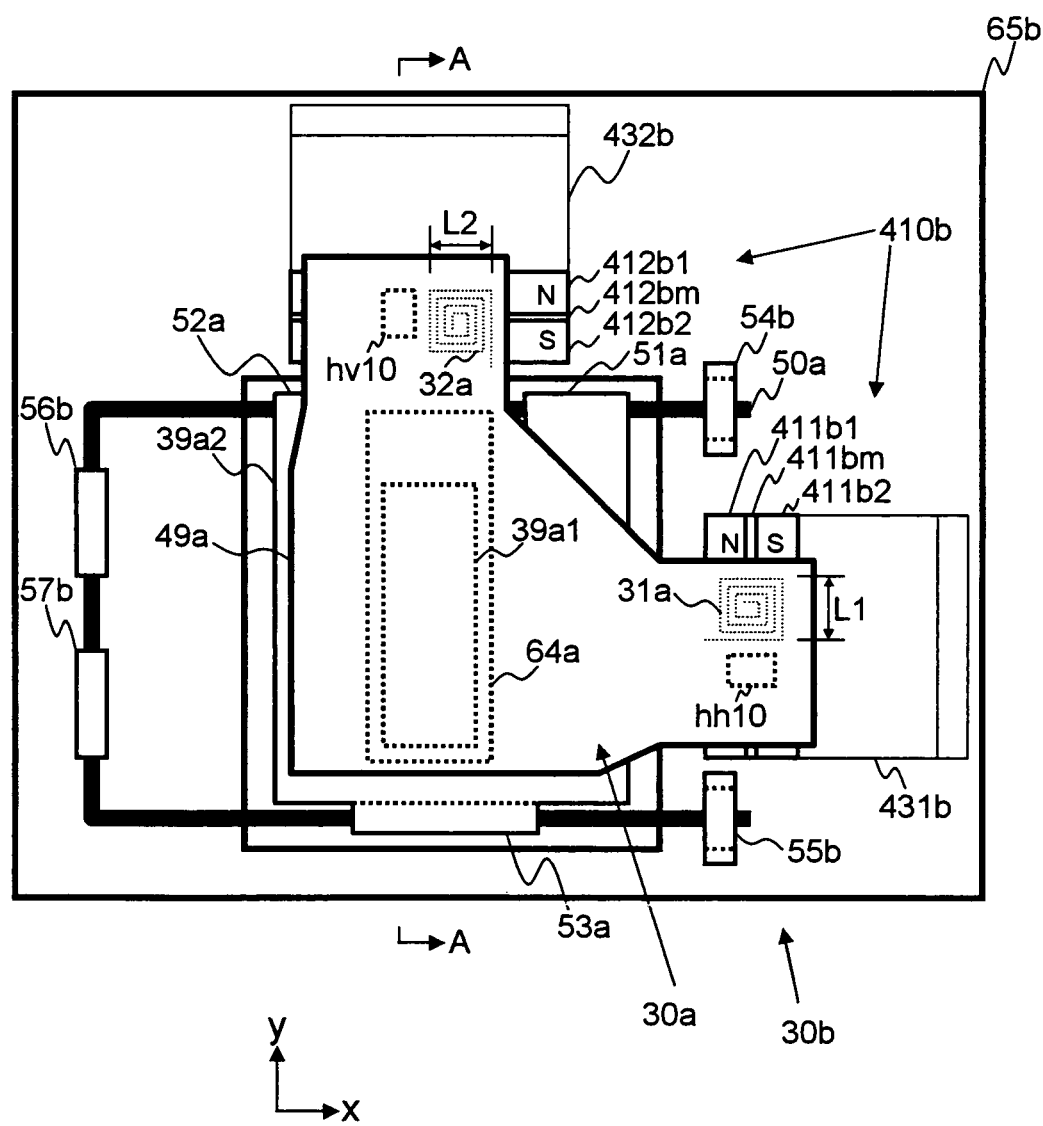
FIG. 4 is a figure showing the construction of the anti-shake unit.
Figure 5:
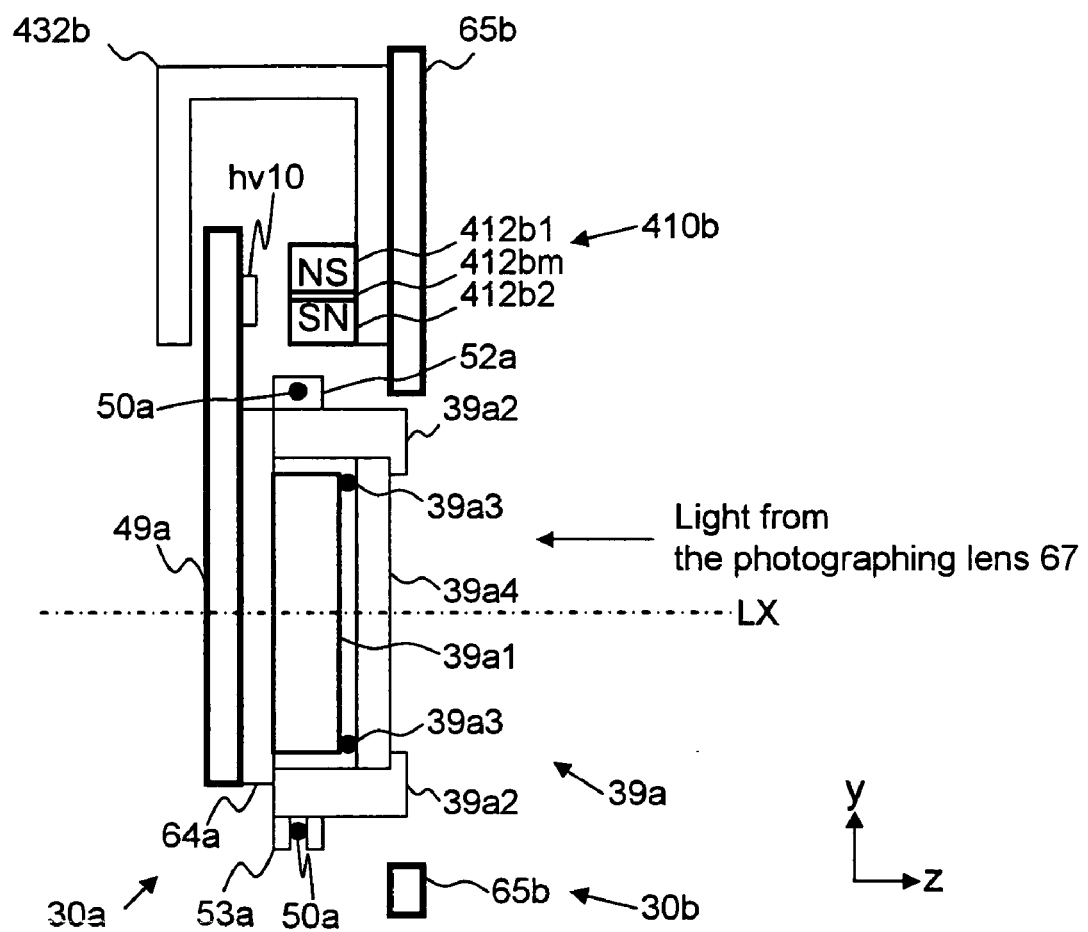
FIG. 5 is a view along line A-A of FIG. 4.

FIG. 5 shows a construction diagram of the section along line A-A of FIG. 4.

Figure 2:
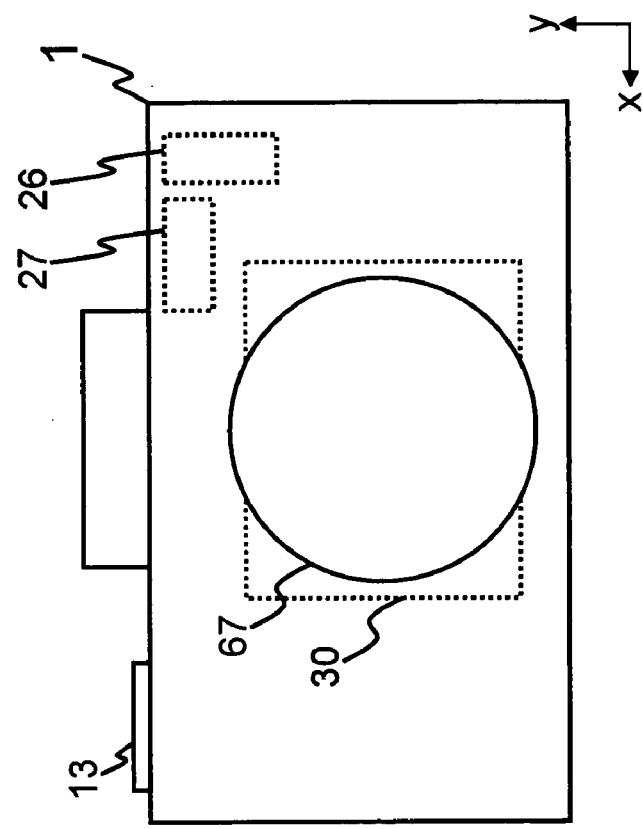
FIG. 2 is a front view of the photographing apparatus.
Figure 3:
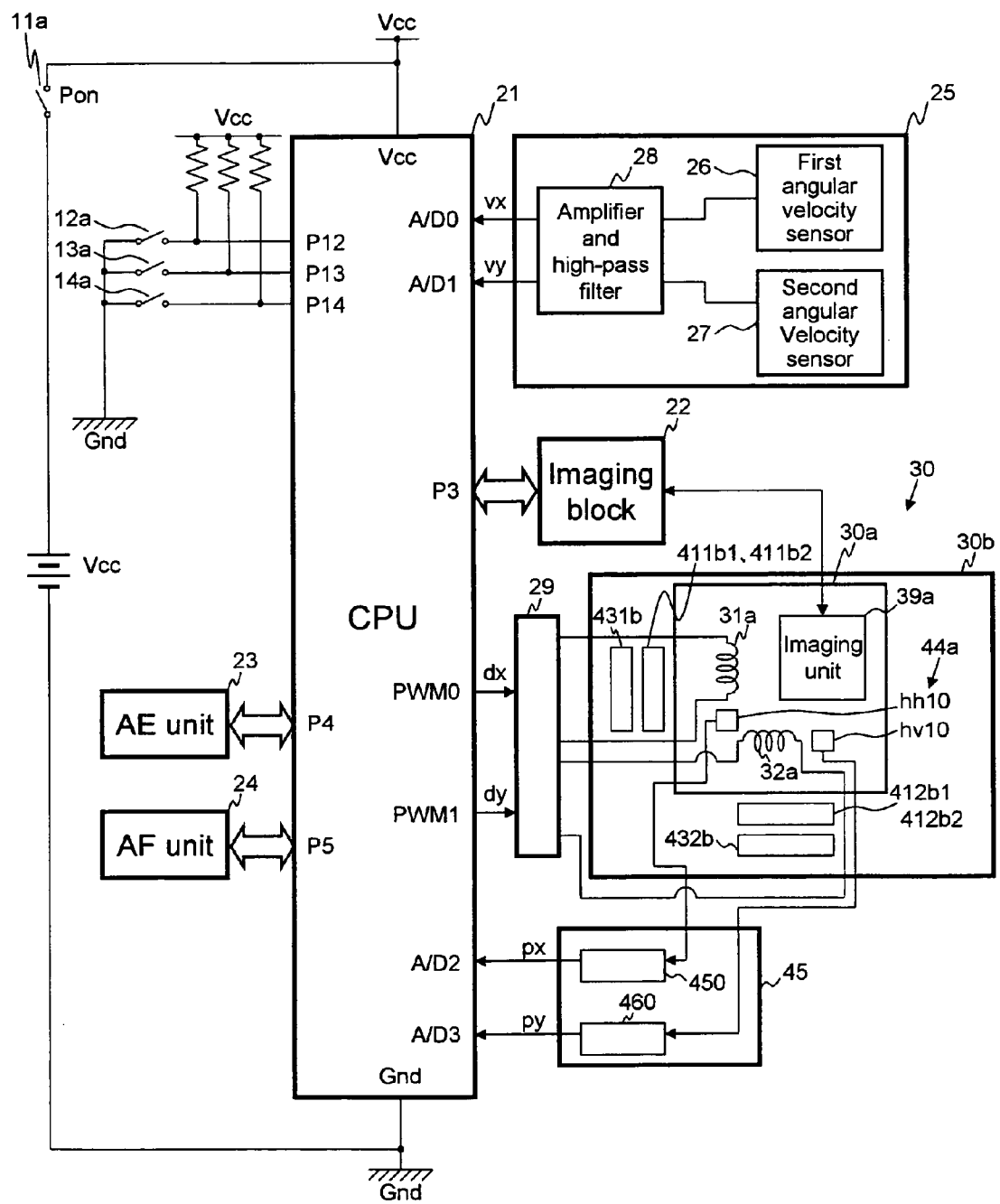
FIG. 3 is a circuit construction diagram of the photographing apparatus.

The imaging part of the photographing apparatus 1 comprises a Pon button 11, a Pon switch 11a, a photometric switch 12a, a release button 13, a release switch 13a, an LCD monitor 17, a CPU 21, an imaging block 22, an AE (automatic exposure) unit 23, an AF (automatic focusing) unit 24, an imaging unit 39a in the anti-shake unit 30, and a photographing lens 67 (see FIGS. 1, 2, and 3).

Whether the Pon switch 11a is in the on state or the off state, is determined by a state of the Pon button 11, so that the on/off states of the photographing apparatus 1 are changed corresponding to the on/off states of the Pon switch 11a.

The photographic subject image is taken as an optical image through the photographing lens 67 by the imaging block 22, which drives the imaging unit 39a, so that the image, which is taken, is indicated on the LCD monitor 17. The photographic subject image can be optically observed by the optical finder (not depicted).

When the release button 13 is half pushed by the operator, the photometric switch 12a changes to the on state, so that the photometric operation, the AF sensing operation, and the focusing operation are performed.

When the release button 13 is fully pushed by the operator, the release switch 13a changes to the on state, so that the imaging operation is performed, and the image, which is taken, is stored.

The CPU 21 is a control apparatus, which controls each part of the photographing apparatus 1 regarding the imaging operation, and controls each part of the photographing apparatus 1 regarding the anti-shake operation. The anti-shake operation controls the movement of the movable unit 30a and controls detecting the position of the movable unit 30a.

The imaging block 22 drives the imaging unit 39a. The AE unit 23 performs the photometric operation for the photographic subject, calculates the photometric values, and calculates the aperture value and the time length of the exposure time, which is needed for imaging, corresponding to the photometric values. The AF unit 24 performs the AF sensing operation, and performs the focusing operation, which is needed for the imaging, corresponding to the result of the AF sensing operation. In the focusing operation, the position of the photographing lens 67 is moved in the optical axis LX direction.

The anti-shaking part of the photographing apparatus 1 comprises an anti-shake button 14, an anti-shake switch 14a, a CPU 21, an angular velocity detecting unit 25, a driver circuit 29, an anti-shake unit 30, a hall-element signal-processing unit 45, and the photographing lens 67.

When the anti-shake button 14 is fully pushed by the operator, the anti-shake switch 14a changes to the on state, so that the anti-shake operation is performed where the angular velocity detecting unit 25 and the anti-shake unit 30 are driven, at every predetermined time interval, independently of the other operations which include the photometric operation etc. When the anti-shake switch 14a is in the on state, in other words in the anti-shake mode, the parameter IS is set to 1 (IS=1). When the anti-shake switch 14a is not in the on state, in other words in the non anti-shake mode, the parameter IS is set to 0 (IS=0). In this embodiment, the predetermined time interval is 1 ms.

The various output commands corresponding to the input signals of these switches are controlled by the CPU 21.

The information regarding whether the photometric switch 12a is in the on state or in the off state, is input to port P12 of the CPU 21 as a 1-bit digital signal. The information regarding whether the release switch 13a is in the on state or in the off state, is input to port P13 of the CPU 21 as a 1-bit digital signal. The information regarding whether the anti-shake switch 14a is in the on state or in the off state, is input to port P14 of the CPU 21 as a 1-bit digital signal.

The imaging block 22 is connected to port P3 of the CPU 21 for inputting and outputting signals. The AE unit 23 is connected to port P4 of the CPU 21 for inputting and outputting signals. The AF unit 24 is connected to port P5 of the CPU 21 for inputting and outputting signals.

Next, the details of the input and output relationship with the CPU 21 for the angular velocity unit 25, the driver circuit 29, the anti-shake unit 30, and the hall-element signal-processing unit 45 are explained.

The angular velocity unit 25 has a first angular velocity sensor 26, a second angular velocity sensor 27, and a combined amplifier and high-pass filter circuit 28. The first angular velocity sensor 26 detects the velocity-component in the first direction x of the angular velocity of the photographing apparatus 1, at every predetermined time interval (1 ms). The second angular velocity sensor 27 detects the velocity-component in the second direction y of the angular velocity of the photographing apparatus 1, at every predetermined time interval (1 ms).

The combined amplifier and high-pass filter circuit 28 amplifies the signal regarding the first direction x of the angular velocity (the velocity-component in the first direction x of the angular velocity), reduces a null voltage and a panning of the first angular velocity sensor 26, and outputs the analogue signal to the A/D converter A/D 0 of the CPU 21 as a first angular velocity vx.

The combined amplifier and high-pass filter circuit 28 amplifies the signal regarding the second direction y of the angular velocity (the velocity-component in the second direction y of the angular velocity), reduces a null voltage and a panning of the second angular velocity sensor 27, and outputs the analogue signal to the A/D converter A/D 1 of the CPU 21 as a second angular velocity vy.

The CPU 21 converts the first angular velocity vx which is input to the A/D converter A/D 0 and the second angular velocity vy which is input to the A/D converter A/D 1 to digital signals (A/D converting operation), and calculates the hand-shake quantity, which occurs in the predetermined time (1 ms), on the basis of the converted digital signals and the converting coefficient, where focal distance is considered. Accordingly, the CPU 21 and the angular velocity detecting unit 25 have a function which calculates the hand-shake quantity.

The CPU 21 calculates the position S of the imaging unit 39a (the movable unit 30a), which should be moved to, corresponding to the hand-shake quantity which is calculated, for the first direction x and the second direction y. The location in the first direction x of the position S is defined as sx, and the location in the second direction y of the position S is defined as sy. The movement of the movable unit 30a, which includes the imaging unit 39a, is performed by using electromagnetic force and is described later. The driving force D, which drives the driver circuit 29 in order to move the movable unit 30a to the position S, has a first PWM duty dx as the driving-force component in the first direction x, and a second PWM duty dy as the driving-force component in the second direction y.

The anti-shake unit 30 is an apparatus which corrects the hand-shake effect, by moving the imaging unit 39a to the position S, by canceling lag of the photographic subject image on the imaging surface of the imaging device 39a1, and by stabilizing the photographing subject image that reaches the imaging surface of the imaging device 39a1.

The anti-shake unit 30 has a movable unit 30a, which includes the imaging unit 39a, and a fixed unit 30b. Or, the anti-shake unit 30 is composed of a driving part which moves the movable unit 30a by electro-magnetic force to the position S, and a position-detecting part which detects the position of the movable unit 30a (a detected-position P).

The size and the direction of the electro-magnetic force are determined by the size and the direction of the current which flows in the coil, and the size and the direction of the magnetic-field of the magnet.

The driving of the movable unit 30a of the anti-shake unit 30, is performed by the driver circuit 29 which has the first PWM duty dx input from the PWM 0 of the CPU 21 and has the second PWM duty dy input from the PWM 1 of the CPU 21. The detected-position P of the movable unit 30a, either before moving or after moving, which is moved by driving the driver circuit 29, is detected by the hall element unit 44a and the hall-element signal-processing unit 45.

Information of a first location in the first direction x for the detected-position P, in other words a first detected-position signal px is input to the A/D converter A/D 2 of the CPU 21. The first detected-position signal px is an analogue signal, and is converted to a digital signal through the A/D converter A/D 2 (A/D converting operation). The first location in the first is direction x for the detected-position P, after the A/D converting operation, is defined as pdx, corresponding to the first detected-position signal px.

Information of a second location in the second direction y for the detected-position P, in other words a second detected-position signal py is input to the A/D converter A/D 3 of the CPU 21. The second detected-position signal py is an analogue signal, and is converted to a digital signal through the A/D converter A/D 3 (A/D converting operation). The second location in the second direction y for the detected-position P, after the A/D converting operation, is defined as pdy, corresponding to the second detected-position signal py.

The PID (Proportional Integral Differential) control is performed on the basis of the data for the detected-position P (pdx, pdy) and the data for the position S (sx, sy) which should be moved to.

The movable unit 30a has a first driving coil 31a, a second driving coil 32a, an imaging unit 39a, a hall element unit 44a, a movable circuit board 49a, a shaft for movement 50a, a first bearing unit for horizontal movement 51a, a second bearing unit for horizontal movement 52a, a third bearing unit for horizontal movement 53a, and a plate 64a (see FIGS. 4 and 5).

The fixed unit 30b has a position-detecting and driving magnet unit 410b, a first position-detecting and driving yoke 431b, a second position-detecting and driving yoke 432b, a first bearing unit for vertical movement 54b, a second bearing unit for vertical movement 55b, a third bearing unit for vertical movement 56b, a fourth bearing unit for vertical movement 57b, and a base board 65b. The position-detecting and driving magnet unit 410b has a first horizontal position-detecting and driving magnet 411b1, a second horizontal position-detecting and driving magnet 411b2, a first vertical position-detecting and driving magnet 412b1, and a second vertical position-detecting and driving magnet 412b2.

The shaft for movement 50a of the movable unit 30a has a channel shape when viewed from the third direction z. The first, second, third, and fourth bearing units for vertical movement 54b, 55b, 56b, and 57b are attached to the base board 65b of the fixed unit 30b. The shaft for movement 50a is slidably supported in the vertical direction (the second direction y), by the first, second, third, and fourth bearing units for vertical movement 54b, 55b, 56b, and 57b.

The first and second bearing units for vertical movement 54b and 55b have slots which extend in the second direction y.

Therefore, the movable unit 30a can move relative to the fixed unit 30b, in the vertical direction (the second direction y).

The shaft for movement 50a is slidably supported in the horizontal direction (the first direction x), by the first, second, and third bearing units for horizontal movement 51a, 52a, and 53a of the movable unit 30a. Therefore, the movable unit 30a, except for the shaft for movement 50a, can move relative to the fixed unit 30b and the shaft for movement 50a, in the horizontal direction (the first direction x).

When the center area of the imaging device 39a1 is located on the optical axis LX of the photographing lens 67, the location relation between the movable unit 30a and the fixed unit 30b is set up so that the movable unit 30a is located at the center of its movement range in both the first direction x and the second direction y, in order to utilize the full size of the imaging range of the imaging device 39a1.

A rectangle shape, which forms the imaging surface of the imaging device 39a1, has two diagonal lines. In this embodiment, the center of the imaging device 39a1 is the crossing point of these two diagonal lines.

The imaging unit 39a, the plate 64a, and the movable circuit board 49a are attached, in this order along the optical axis LX direction, viewed from the side of the photographing lens 67. The imaging unit 39a has an imaging device 39a1 (such as a CCD or a COMS etc.), a stage 39a2, a holding unit 39a3, and an optical low-pass filter 39a4. The stage 39a2 and the plate 64a hold and urge the imaging device 39a1, the holding unit 39a3, and the optical low-pass filter 39a4 in the optical axis LX direction.

The first, second, and third bearing units for horizontal movement 51a, 52a, and 53a are attached to the stage 39a2. The imaging device 39a1 is attached to the plate 64a, so that positioning of the imaging device 39a1 is performed where the imaging device 39a1 is perpendicular to the optical axis LX of the photographing lens 67. In the case where the plate 64a is made of a metallic material, the plate 64a has the effect of radiating heat from the imaging device 39a1, by contacting the imaging device 39a1.

The first driving coil 31a, the second driving coil 32a, and the hall element unit 44a are attached to the movable circuit board 49a.

The first driving coil 31a forms a seat and a spiral shape coil pattern. The coil pattern of the first driving coil 31a has lines which are parallel to either the first direction x or the second direction y, where the movable unit 30a which includes the first driving coil 31a, is moved in the first direction x, by a first electromagnetic force. The lines which are parallel to the second direction y, are used for moving the movable unit 30a in the first direction x. The lines which are parallel to the second direction y, have a first effective length L1.

The first electromagnetic force occurs on the basis of the current direction of the first driving coil 31a and the magnetic-field direction of the first and second horizontal position-detecting and driving magnets 411b1 and 411b2.

The second driving coil 32a forms a seat and a spiral shape coil pattern. The coil pattern of the second driving coil 32a has lines which are parallel to either the first direction x or the second direction y, where the movable unit 30a which includes the second driving coil 32a, is moved in the second direction y, by a second electromagnetic force. The lines which are parallel to the first direction x, are used for moving the movable unit 30a in the second direction y. The lines which are parallel to the first direction x, have a second effective length L2.

The second electro-magnetic force occurs on the basis of the current direction of the second driving coil 32a and the magnetic-field direction of the first and second vertical position-detecting and driving magnets 412b1 and 412b2.

The first and second driving coils 31a and 32a are connected with the driver circuit 29 which drives the first and second driving coils 31a and 32a through the flexible circuit board (not depicted). The first PWM duty dx is input to the driver circuit 29 from the PWM 0 of the CPU 21, and the second PWM duty dy is input to the driver circuit 29 from the PWM 1 of the CPU 21. The driver circuit 29 supplies power to the first driving coil 31a corresponding to the value of the first PWM duty dx, and to the second driving coil 32a corresponding to the value of the second PWM duty dy, to drive the movable unit 30a.

The first and second horizontal position-detecting and driving magnets 411b1 and 411b2 are attached to the movable unit side of the fixed unit 30b, where the first and second horizontal position-detecting and driving magnets 411b1 and 411b2 face the first driving coil 31a and the horizontal hall element hh10 in the third direction z.

The first and second vertical position-detecting and driving magnets 412b1 and 412b2 are attached to the movable unit side of the fixed unit 30b, where the first and second vertical position-detecting and driving magnets 412b1 and 412b2 face the second driving coil 32a and the vertical hall element hv10 in the third direction z.

The N pole and S pole of the first horizontal position-detecting and driving magnet 411b1 are arranged in the third direction z. The N pole and S pole of the second horizontal position-detecting and driving magnet 411b2 are arranged in the third direction z.

The first and second horizontal position-detecting and driving magnets 411b1 and 411b2 are attached to the first position-detecting and driving yoke 431b, under the condition where the N pole of the first horizontal position-detecting and driving magnet 411b1 and the S pole of the second horizontal position-detecting and driving magnet 411b2 are arranged and in the first direction x.

The polarities of the first and second horizontal position-detecting and driving magnets 411b1 and 411b2 are arranged in opposite directions, in the third direction z.

The first position-detecting and driving yoke 431b is attached to the base board 65b of the fixed unit 30b, on the side of the movable unit 30a, in the third direction Z.

The lengths of the first and second horizontal position-detecting and driving magnets 411b1 and 411b2 in the second direction y, are longer in comparison with the first effective length L1 of the first driving coil 31a. The magnetic-field which influences the first driving coil 31a and the horizontal hall element hh10, is not changed during movement of the movable unit 30a in the second direction y.

The position-detecting and driving magnet unit 410b has a first spacer 411bm between the first and second horizontal position-detecting and driving magnets 411b1 and 411b2, which is made of a non-magnetic material. The first spacer 411bm forms a rectangular prism which has a width d in the first direction x, so that the first spacer 411bm keeps the first and second horizontal position-detecting and driving magnets 411b1 and 411b2 at a predetermined interval d.

Figure 6:
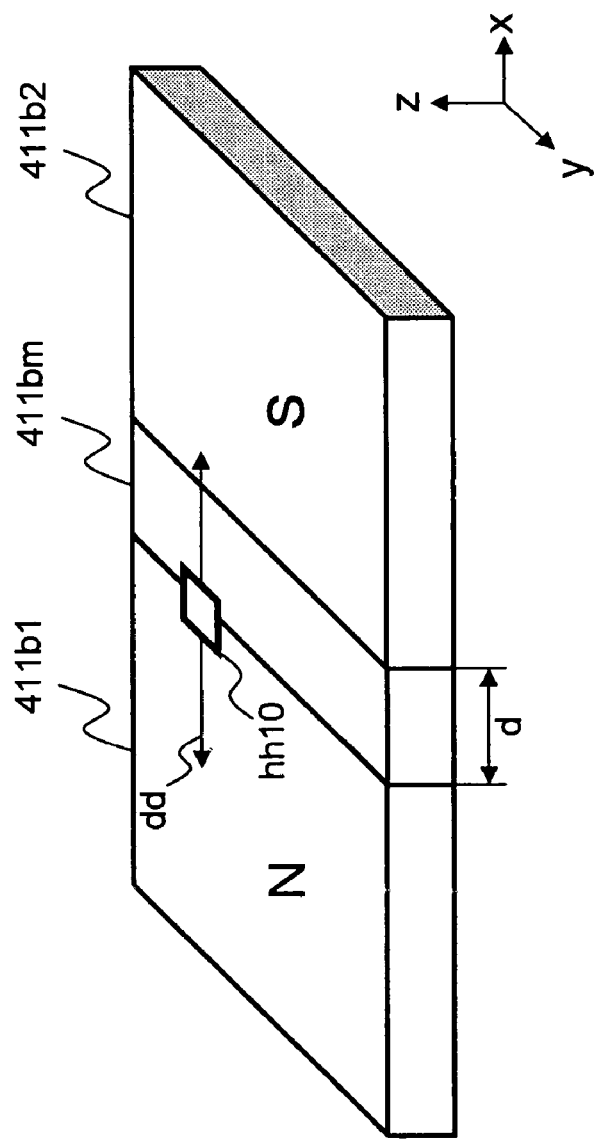
FIG. 6 is a perspective view of a construction of the first and second horizontal position-detecting and driving magnets and the first spacer.
Figure 7:
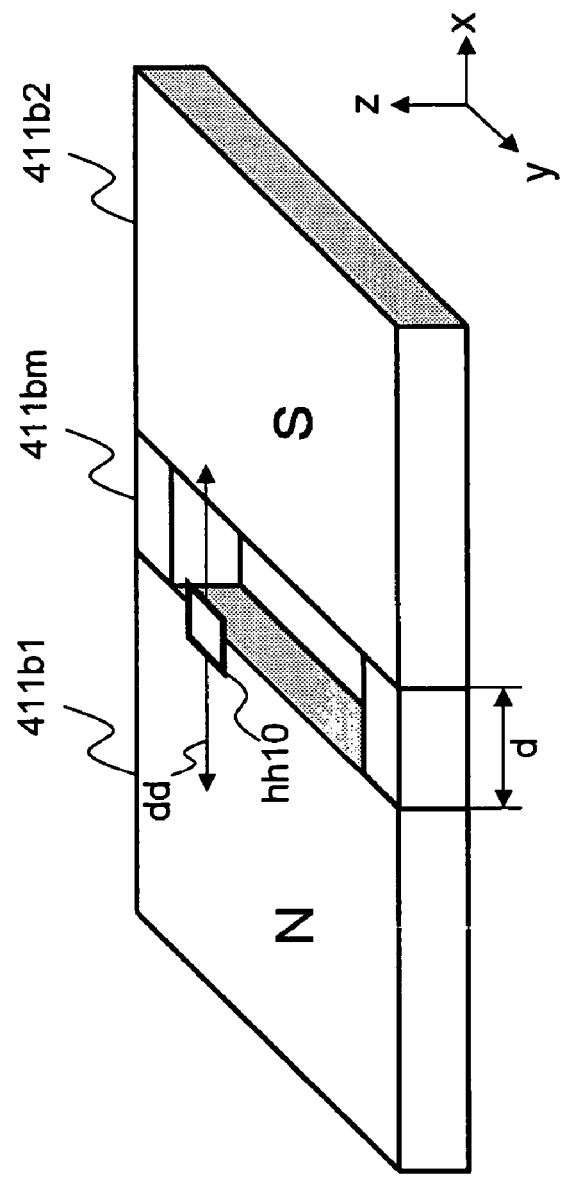
FIG. 7 is a perspective view of a construction of the first and second horizontal position-detecting and driving magnets and the first spacer, of a different mode to that of FIG. 6.

The first spacer 411bm may not have an opening in the second direction y (see FIG. 6), or may have an opening in the second direction y (see FIG. 7), under the condition where the first spacer 411bm can keep the first and second horizontal position-detecting and driving magnets 411b1 and 411b2 at the predetermined interval d.

A magnetic force occurs between the first and second horizontal position-detecting and driving magnets 411b1 and 411b2, because the polarities of the first and second horizontal position-detecting and driving magnets 411b1 and 411b2 are arranged in opposite directions, in the third direction z. However, a first distance between the first and second horizontal position-detecting and driving magnets 411b1 and 411b2 in the first direction x is kept at the interval d, due to the first spacer 411bm.

Further, if the first and second horizontal position-detecting and driving magnets 411b1 and 411b2 are attached to the first position-detecting and driving yoke 431b under the condition where the first distance between the first and second horizontal position-detecting and driving magnets 411b1 and 411b2 in the first direction x is kept at the interval d, without the first spacer 411bm, the position-detecting and driving magnet unit 410b does not need to have the first spacer 411bm.

The N pole and S pole of the first vertical position-detecting and driving magnet 412b1 are arranged in the third direction z. The N pole and S pole of the second vertical position-detecting and driving magnet 412b2 are arranged in the third direction z.

The first and second vertical position-detecting and driving magnets 412b1 and 412b2 are attached to the second position-detecting and driving yoke 432b, under the condition where the N pole of the first vertical position-detecting magnet 412b1 and the S pole of the second vertical position-detecting and driving magnet 412b2 are arranged in the second direction y.

The polarities of the first and second vertical position-detecting and driving magnets 412b1 and 412b2 are arranged in opposite directions, in the third direction z.

The second position-detecting and driving yoke 432b is attached to the base board 65b of the fixed unit 30b, on the side of the movable unit 30a, in the third direction Z.

The lengths of the first and second vertical position-detecting and driving magnets 412b1 and 412b2 in the first direction x, are longer in comparison with the second effective length L2 of the second driving coil 32a. The magnetic-field which influences the second driving coil 32a and the vertical hall element hv10, is not changed during movement of the movable unit 30a in the first direction x.

The position-detecting and driving magnet unit 410b has a second spacer 412bm between the first and second vertical position-detecting and driving magnets 412b1 and 412b2, which is made of a non-magnetic material. The second spacer 412bm forms a rectangular prism which has a width d in the second direction y, so that the second spacer 412bm keeps the first and second vertical position-detecting and driving magnets 412b1 and 412b2 at a predetermined interval d.

The second spacer 412bm may not have an opening in the first direction x (not depicted), or may have an opening in the first direction x (not depicted), under the condition where the second spacer 412*bm* can keep the first and second vertical position-detecting and driving magnets 412*b*1 and 412*b*2 at the predetermined interval d.

A magnetic force occurs between the first and second vertical position-detecting and driving magnets 412*b*1 and 412*b*2, because the polarities of the first and second vertical position-detecting and driving magnets 412*b*1 and 412*b*2 are arranged in opposite directions, in the third direction z. However, a second distance between the first and second vertical position-detecting and driving magnets 412*b*1 and 412*b*2 in the second direction y is kept at the interval d, due to the second spacer 412*bm*.

Further, if the first and second vertical position-detecting and driving magnets 412*b*1 and 412*b*2 are attached to the second position-detecting and driving yoke 432*b* under the condition where the second distance between the first and second vertical position-detecting and driving magnets 412*b*1 and 412*b*2 in the second direction y is kept at the interval d, without the second spacer 412*bm*, the position-detecting and driving magnet unit 410*b* does not need to have the second spacer 412*bm*.

The first position-detecting and driving yoke 431*b* is made of a soft magnetic material, and forms a square-u-shape channel when viewed from the second direction y. The first and second horizontal position-detecting and driving magnets 411*b*1 and 411*b*2, the first driving coil 31*a*, and the horizontal hall element hh10 are inside the channel of the first position-detecting and driving yoke 431*b*.

The side of the first position-detecting and driving yoke 431*b*, which contacts the first and second horizontal position-detecting and driving magnets 411*b*1 and 411*b*2, prevents the magnetic-field of the first and second horizontal position-detecting and driving magnets 411*b*1 and 411*b*2 from leaking to the surroundings.

The other side of the first position-detecting and driving yoke 431*b* (which faces the first and second horizontal position-detecting and driving magnets 411*b*1 and 411*b*2, the first driving coil 31*a*, and the movable circuit board 49*a*) raises the magnetic-flux density between the first and second horizontal position-detecting and driving magnets 411*b*1 and 411*b*2 and the first driving coil 31*a*, and between the first and second horizontal position-detecting and driving magnets 411*b*1 and 411*b*2 and the horizontal hall element hh10.

The second position-detecting and driving yoke 432*b* is made of a soft magnetic material, and forms a square-u-shape channel when viewed from the first direction x. The first and second vertical position-detecting and driving magnets 412*b*1 and 412*b*2, the second driving coil 32*a*, and the vertical hall element hv10 are inside the channel of the second position-detecting and driving yoke 432*b*.

The side of the second position-detecting and driving yoke 432*b*, which contacts the first and second position-detecting and driving magnets 412*b*1 and 412*b*2, prevents the magnetic-field of the first and second position-detecting and driving magnets 412*b*1 and 412*b*2 from leaking to the surroundings.

The other side of the second position-detecting and driving yoke 432*b* (which faces the first and second vertical position-detecting and driving magnets 412*b*1 and 412*b*2, the second driving coil 32*a*, and the movable circuit board 49*a*) raises the magnetic-flux density between the first and second vertical position-detecting and driving magnets 412*b*1 and 412*b*2 and the second driving coil 32*a*, and between the first and second vertical position-detecting and driving magnets 412*b*1 and 412*b*2 and the vertical hall element hv10.

The hall element unit 44*a* is a one-axis hall element which has two hall elements that are magnetoelectric converting elements (magnetic-field change-detecting elements) using the Hall Effect. The hall element unit 44*a* detects the first detected-position signal px which is used for specifying the first location in the first direction x for the present position P of the movable unit 30*a*, and the second detected-position signal py which is used for specifying the second location in the second direction y for the present position P of the movable unit 30*a*.

One of the two hall elements is a horizontal hall element hh10 for detecting the first location in the first direction x of the movable unit 30*a*, so that the other is a vertical hall element hv10 for detecting the second location in the second direction y of the movable unit 30*a* (see FIG. 4).

The horizontal hall element hh10 is attached to the movable circuit board 49*a* of the movable unit 30*a*, under the condition where the horizontal hall element hh10 faces the first and second horizontal position-detecting and driving magnets 411*b*1 and 411*b*2 of the fixed unit 30*b*, in the third direction z.

The vertical hall element hv10 is attached to the movable circuit board 49*a* of the movable unit 30*a*, under the condition where the vertical hall element hv10 faces the first and second vertical position-detecting and driving magnets 412*b*1 and 412*b*2 of the fixed unit 30*b*, in the third direction z.

When the center of the imaging device 39*a*1, passes through the optical axis LX, it is desirable that the horizontal hall element hh10 is located at a place on the hall element unit 44*a* which faces an intermediate area of the first spacer 411*bm*, in other words the intermediate area between the first and second horizontal position-detecting and driving magnets 411*b*1 and 411*b*2, in the first direction x, viewed from the third direction z, to perform the position-detecting operation utilizing the full size of the range where an accurate position-detecting operation can be performed based on the linear output-change (linearity) of the one-axis hall element.

Similarly, when the center of the imaging device 39*a*1, passes through the optical axis LX, it is desirable that the vertical hall element hv10 is located at a place on the hall element unit 44*a* which faces an intermediate area of the second spacer 412*bm*, in other words the intermediate area between the first and second vertical position-detecting and driving magnets 412*b*1 and 412*b*2, in the second direction y, viewed from the third direction z.

The base board 65*b* is a plate state member which becomes the base for attaching the first position-detecting and driving yoke 431*b* etc., and is arranged being parallel to the imaging surface of the imaging device 39*a*1.

In this embodiment, the base board 65*b* is arranged at the side nearer to the photographing lens 67 in comparison with the movable circuit board 49*a*, in the third direction z. However, the movable circuit board 49*a* may be arranged at the side nearer to the photographing lens 67 in comparison with the base board 65*b*. In this case, the first and second driving coils 31*a* and 32*a*, and the hall element unit 44*a* are arranged on the opposite side of the movable circuit board 49*a* to the photographing lens 67, so that the position-detecting and driving magnet unit 410*b* is arranged on the same side of the base board 65*b* as the photographing lens 67.

The hall-element signal-processing unit 45 has a first hall-element signal-processing circuit 450 and a second hall-element signal-processing circuit 460.

The first hall-element signal-processing circuit 450 detects a horizontal potential-difference x10 between output terminals of the horizontal hall element hh10, based on an output signal of the horizontal hall element hh10.

The first hall-element signal-processing circuit 450 outputs the first detected-position signal px, which specifies the first location in the first direction x of the movable unit 30a, to the A/D converter A/D 2 of the CPU 21, on the basis of the horizontal potential-difference x10.

The second hall-element signal-processing circuit 460 detects a vertical potential-difference y10 between output terminals of the vertical hall element hv10, based on an output signal of the vertical hall element hv10.

The second hall-element signal-processing circuit 460 outputs the second detected-position signal py, which specifies the second location in the second direction y of the movable unit 30a, to the A/D converter A/D 3 of the CPU 21, on the basis of the vertical potential-difference y10.

Figure 8:
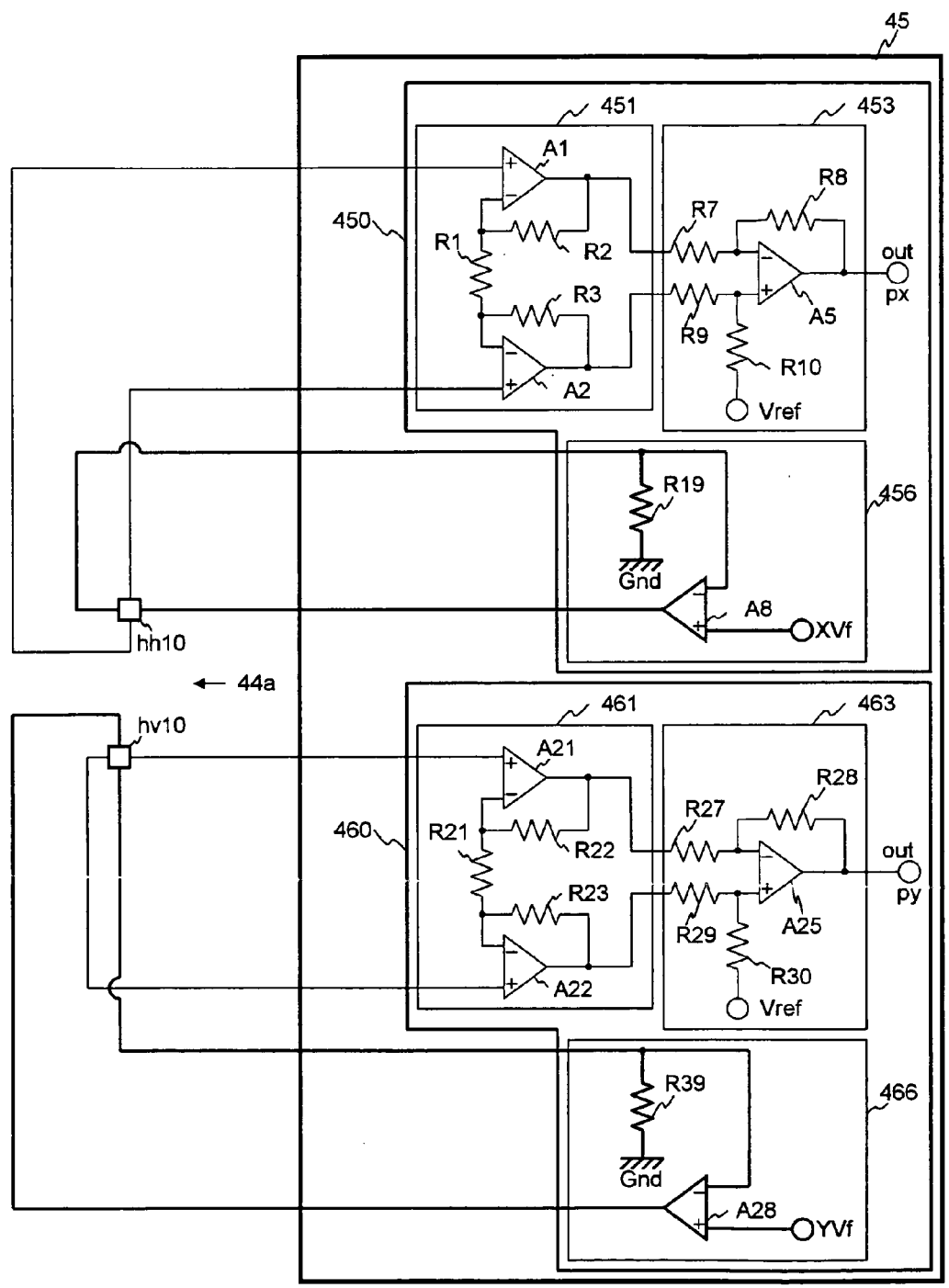
FIG. 8 is a circuit construction diagram of the circuit, the hall element unit, and the hall-element signal-processing circuit.

The circuit construction regarding input/output signals of the horizontal hall element hh10, in the first hall-element signal-processing circuit 450 of the hall-element signal-processing circuit 45, and the circuit construction regarding input/output signals of the vertical hall element hv10, in the second hall-element signal-processing circuit 460 of the hall-element signal-processing circuit 45 are explained using FIG. 8.

The first hall-element signal-processing circuit 450 has a horizontal differential amplifier circuit 451 and a horizontal subtracting amplifier circuit 453 for controlling the output of the horizontal hall element hh10, and has a horizontal input circuit 456 for controlling the input of the horizontal hall element hh10.

The second hall-element signal-processing circuit 460 has a vertical differential amplifier circuit 461 and a vertical subtracting amplifier circuit 463 for controlling the output of the vertical hall element hv10, and has a vertical input circuit 466 for controlling the input of the vertical hall element hv10.

Both output terminals of the horizontal hall element hh10 are connected with the horizontal differential amplifier circuit 451, so that the horizontal differential amplifier circuit 451 is connected with the horizontal subtracting amplifier circuit 453.

The horizontal differential amplifier circuit 451 is a differential amplifier circuit which amplifies a first signal difference between the output terminals of the horizontal hall element hh10.

The horizontal subtracting amplifier circuit 453 is a subtracting amplifier circuit which calculates the horizontal potential-difference x10 (the hall output voltage) on the basis of the difference between the amplified first signal difference from the horizontal differential amplifier circuit 451 and a reference voltage Vref, and which calculates the first detected-position signal px by multiplying a first amplification rate by the horizontal potential-difference x10.

The horizontal differential amplifier circuit 451 has a resistor R1, a resistor R2, a resistor R3, a first horizontal operational amplifier A1, and a second horizontal operational amplifier A2. The first horizontal operational amplifier A1 has an inverting input terminal, a non-inverting input terminal, and an output terminal. The second horizontal operational amplifier A2 has an inverting input terminal, a non-inverting input terminal, and an output terminal.

One of the output terminals of the horizontal hall element hh10 is connected with the non-inverting input terminal of the first horizontal operational amplifier A1, so that the other terminal of the horizontal hall element hh10 is connected with the non-inverting input terminal of the second horizontal operational amplifier A2.

The inverting input terminal of the first horizontal operational amplifier A1 is connected with the resistors R1 and R2, so that the inverting input terminal of the second horizontal operational amplifier A2 is connected with the resistors R1 and R3.

The output terminal of the first horizontal operational amplifier A1 is connected with the resistor R2 and the first horizontal resistor R7 in the horizontal subtracting amplifier circuit 453. The output terminal of the second horizontal operational amplifier A2 is connected with the resistor R3 and the third horizontal resistor R9 in the horizontal subtracting amplifier circuit 453.

The horizontal subtracting amplifier circuit 453 has a first horizontal resistor R7, a second horizontal resistor RB, a third horizontal resistor R9, a fourth horizontal resistor R10, and a third horizontal operational amplifier A5. The third horizontal operational amplifier A5 has an inverting input terminal, a non-inverting input terminal, and an output terminal.

The inverting input terminal of the third horizontal operational amplifier A5 is connected with the first horizontal resistor R7 and the second horizontal resistor RB. The non-inverting input terminal of the third horizontal operational amplifier A5 is connected with the third horizontal resistor R9 and the fourth horizontal resistor R10. The output terminal of the third horizontal operational amplifier A5 is connected with the second horizontal resistor RB. The first detected-position signal px, which is obtained by multiplying the first amplification rate, by the horizontal potential-difference x10, is output from the output terminal of the third horizontal operational amplifier A5. One of the terminals of the fourth horizontal resistor R10 is connected with the power supply whose voltage is the reference voltage Vref.

The values of the resistors R2 and R3 are the same. The values of the first horizontal resistors R7 and the third horizontal resistor R9 are the same. The values of the second horizontal resistor R8 and the fourth horizontal resistor R10 are the same.

The first amplification rate is based on the values of the first to fourth horizontal resistors R7 to R10 (the ratio of the value of the resistor R7 to the value of the resistor R8).

The first and second horizontal operational amplifiers A1 and A2 are the same type of amplifier.

The horizontal input circuit 456 has a resistor R19 and an operational amplifier A8. The operational amplifier A8 has an inverting input terminal, a non-inverting input terminal, and an output terminal.

The inverting input terminal of the operational amplifier A8 is connected with the resistor R19 and one of the input terminals of the horizontal hall element hh10. The potential of the non-inverting input terminal of the operational amplifier A8 is set at a first predetermined voltage XVf corresponding to the value of the current which passes through the input terminals of the horizontal hall element hh10. The output terminal of the operational amplifier A8 is connected with the other input terminal of the horizontal hall element hh10. One of the terminals of the resistor R19 is grounded.

Both output terminals of the vertical hall element hv10 are connected with the vertical differential amplifier circuit 461, so that the vertical differential amplifier circuit 461 is connected with the vertical subtracting amplifier circuit 463.

The vertical differential amplifier circuit 461 is a differential amplifier circuit which amplifies a second signal difference between the output terminals of the vertical hall element hv10.

The vertical subtracting amplifier circuit 463 is a subtracting amplifier circuit which calculates the vertical potential-difference y10 (the hall output voltage) on the basis of the difference between the amplified second signal difference from the vertical differential amplifier circuit 461 and a reference voltage Vref, and which calculates the second detected-position signal py by multiplying a second amplification rate by the vertical potential-difference y10.

The vertical differential amplifier circuit 461 has a resistor R21, a resistor R22, a resistor R23, a first vertical operational amplifier A21, and a second vertical operational amplifier A22. The first vertical operational amplifier A21 has an inverting input terminal, a non-inverting input terminal, and an output terminal. The second vertical operational amplifier A22 has an inverting input terminal, a non-inverting input terminal, and an output terminal.

One of the output terminals of the vertical hall element hv10 is connected with the non-inverting input terminal of the first vertical operational amplifier A21, so that the other terminal of the vertical hall element hv10 is connected with the non-inverting input terminal of the second vertical operational amplifier A22.

The inverting input terminal of the first vertical operational amplifier A21 is connected with the resistors R21 and R22, so that the inverting input terminal of the second vertical operational amplifier A22 is connected with the resistors R21 and R23.

The output terminal of the first vertical operational amplifier A21 is connected with the resistor R22 and the first vertical resistor R27 in the vertical subtracting amplifier circuit 463. The output terminal of the second vertical operational amplifier A22 is connected with the resistor R23 and the third vertical resistor R29 in the vertical subtracting amplifier circuit 463.

The vertical subtracting amplifier circuit 463 has a first vertical resistor R27, a second vertical resistor R28, a third vertical resistor R29, a fourth vertical resistor R30, and a third vertical operational amplifier A25. The third vertical operational amplifier A25 has an inverting input terminal, a non-inverting input terminal, and an output terminal.

The inverting input terminal of the third vertical operational amplifier A25 is connected with the first vertical resistor R27 and the second vertical resistor R28. The non-inverting input terminal of the third vertical operational amplifier A25 is connected with the third vertical resistor R29 and the fourth vertical resistor R30. The output terminal of the third vertical operational amplifier A25 is connected with the second vertical resistor R28. The second detected-position signal py, which is obtained by multiplying the second amplification rate, by the vertical potential-difference y10, is output from the output terminal of the third vertical operational amplifier A25. One of the terminals of the fourth vertical resistor R30 is connected with the power supply whose voltage is the reference voltage Vref.

The values of the resistors R22 and R23 are the same. The values of the first vertical resistor R27 and the third vertical resistor R29 are the same. The values of the second vertical resistor R28 and the fourth vertical resistor R30 are the same.

The second amplification rate is based on the values of the first to fourth vertical resistors R27 to R30 (the ratio of the value of the resistor R27 to the value of the resistor R28).

The first vertical operational amplifiers A21 and A22 are the same type of amplifier.

The vertical input circuit 463 has a resistor R39 and an operational amplifier A28. The operational amplifier A28 has an inverting input terminal, a non-inverting input terminal, and an output terminal.

The inverting input terminal of the operational amplifier A28 is connected with the resistor R39 and one of the input terminals of the vertical hall element hv10. The potential of the non-inverting input terminal of the operational amplifier A28 is set at a second predetermined is voltage YVf corresponding to the value of the current which passes through the input terminals of the vertical hall element hv10. The output terminal of the operational amplifier A28 is connected with the other input terminal of the vertical hall element hv10. One of the terminals of the resistor R39 is grounded.

In the case where the position-detecting and driving magnet unit 410b has the first spacer 411bm between the first and second horizontal position-detecting and driving magnets 411b1 and 411b2, like this embodiment, a range dd, where an accurate position-detecting operation in the first direction x can be performed based on the linear output-change (linearity) of the one-axis hall element, is enlarged due to the width d of the first spacer 411bm, in comparison with when the position-detecting and driving magnet unit 410b does not have the first spacer 411bm (or the first and second horizontal position-detecting and driving magnets 411b1 and 411b2 are in contact with each other).

Therefore, the movement range of the movable unit 30a in the first direction x is enlarged.

Figure 9:
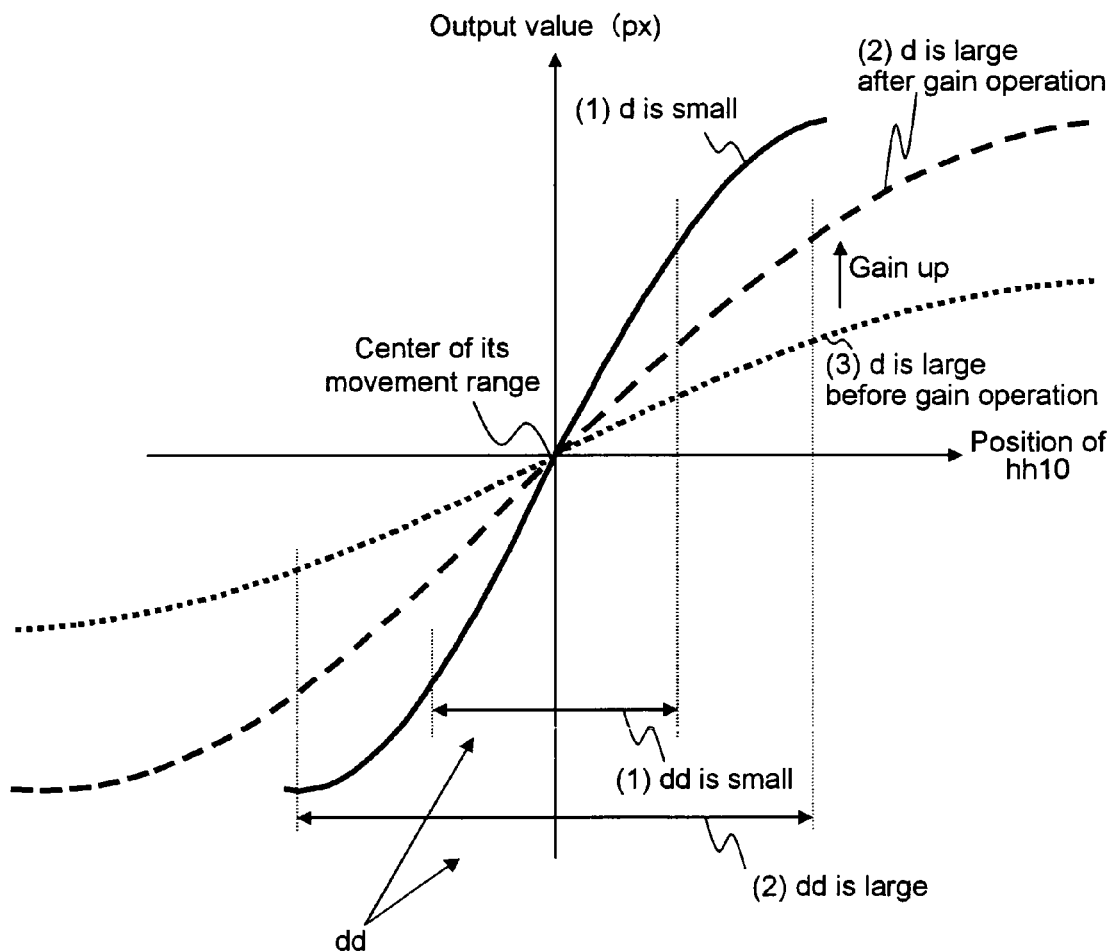
FIG. 9 is a graph which shows a relationship between a position of the horizontal hall element and the first detected-position signal which is the output value of the horizontal hall element.

A relationship between a position of the horizontal hall element hh10 and the first detected-position signal px which is the output value of the horizontal hall element hh10, is explained by a graph in FIG. 9.

In the graph in FIG. 9, the horizontal axis represents a position of the horizontal hall element hh10, the vertical axis represents an output value (the detected-position signal px), the origin represents the center of the movement range of the movable unit 30a, the solid line (1) represents an output value when the value of width d of the first spacer 411bm is small, and the broken line (2) and a dotted line (3) represent output values when the value of width d of the first spacer 411bm is large.

The solid line (1) has a point symmetry shape whose center is the origin. Similarly, the broken line (2) has a point symmetry shape whose center is the origin, and the dotted line (3) has a point symmetry shape whose center is the origin.

A range dd for the solid line (1), where the relationship between the position of the horizontal hall element hh10 and the first detected-position signal px has linearity, is small.

A range dd for the broken line (2) and the dotted line (3) is large in comparison with the range dd for the solid line (1).

For example, when the value of width d of the first spacer 411bm is 0, the value of the range dd is ±0.5 mm (1.0 mm). When the value of the width d of the first spacer 411bm is 0.5 mm, the value of the range dd is ±0.6 mm (1.2 mm). When the value of the width d of the first spacer 411bm is 1.0 mm, the value of the range dd is ±0.7 mm (1.4 mm). When the value of the width d of the first spacer 411bm is 1.5 mm, the value of the range dd is ±1.0 mm (2.0 mm). Accordingly, when the value of width d of the first spacer 411bm is enlarged, the value of the range dd is enlarged.

In the range dd where the relationship between the position of the horizontal hall element hh10 and the first detected-position signal px has linearity, an accurate position-detecting operation can be performed, in comparison with in a range where the relationship between the position of the horizontal hall element hh10 and the first detected-position signal px does not have linearity.

Accordingly, when the hall element is used for detecting the position of the movable unit, and the range where the relationship between the position of the hall element and the output value has linearity, is enlarged, a movement range of the movable unit where an accurate position-detecting operation can be performed, is enlarged.

The movement range of the movable unit for the anti-shake operation, which is needed, is determined by a size of the imaging device and a focal distance of the photographing lens.

For example, when a photographing apparatus has an imaging device whose size is ⅔ inch, and a photographing lens whose focal distance is 400 mm (with 35 mm camera size format conversion), a movement range of the movable unit for the anti-shake operation (anti-shake range) which is needed is ±0.7 mm.

Therefore, if the value of the width d of the first spacer 411$bm$ is set to over 1.0 mm, the value of the range dd can be over ±0.7 mm, so that an accurate position-detecting operation can be performed for the entire movement range of the movable unit for the anti-shake operation.

As an example, when a photographing apparatus has an imaging device whose size is ¾ inch, and a movement range (anti-shake range) whose size is ±0.7 mm, a focal distance where the anti-shake operation can be performed, is under 200 mm (with 35 mm size camera format conversion).

Accordingly, when a photographing apparatus has an imaging device whose size is ¾ inch, and a photographing lens whose focal distance is over 200 mm (with 35 mm camera size format conversion), a movement range of the movable unit for the anti-shake operation, which is needed, is over ±0.7 mm.

However, a magnetic-flux density between the first and second horizontal position-detecting and driving magnets 411$b1$ and 411$b2$, and the horizontal hall element hh10, is decreased due to the first spacer 411$bm$, in comparison to when the position-detecting and driving magnet unit 410$b$ does not have the first spacer 411$bm$, so that the output value (the first detected-position signal px) is decreased (see the solid line (1) and the dotted line (3)).

A maximum value of the output value of the solid line (1) is larger than a maximum value of the output value of the dotted line (3). Similarly, a minimum value of the output value of the solid line (1) is smaller than a minimum value of the output value of the dotted line (3). To enlarge the output value of the dotted line (3) like the broken line (2), a gain operation for the output value (the first detected-position signal px) is needed. The maximum value of the output value of the solid line (1) is the same as a maximum value of the output value of the broken line (2). Similarly, the minimum value of the output value of the solid line (1) is the same as the minimum value of the output value of the broken line (2).

Or, the dotted line (3) is the output value without the gain operation, so that the broken line (2) is the output value with the gain operation.

The gain operation is performed on the basis of increasing the value of the first predetermined voltage XVf which is applied to the input terminals of the horizontal hall element hh10 through the horizontal input circuit 456, or of increasing an amplification rate which is used for calculating the first detected-position signal px.

This increase of the amplification rate is performed by increasing the first amplification rate in the horizontal subtracting amplifier circuit 453, or by increasing the amplification rate by which the horizontal differential amplifier circuit 451 amplifies the signal difference between the output terminals of the horizontal hall element hh10.

In the case where the first amplification rate in the horizontal subtracting amplifier circuit 453 is increased, values of the second and fourth horizontal resistors R8 and R10 are set larger than those of the first and third horizontal resistors R7 and R9.

The effect of the position-detecting and driving magnet unit 410$b$ having the first spacer 411$bm$ between the first and second horizontal position-detecting and driving magnets 411$b1$ and 411$b2$, is similar to the effect of the position-detecting and driving magnet unit 410$b$ having the second spacer 412$bm$ between the first and second vertical position-detecting and driving magnets 412$b1$ and 412$b2$.

The gain operation is performed on the basis of increasing the value of the second predetermined voltage YVf which is applied to the input terminals of the vertical hall element hv10 through the vertical input circuit 466, or of increasing an amplification rate which is used for calculating the second detected-position signal py.

This increase of the amplification rate is performed by increasing the second amplification rate in the vertical subtracting amplifier circuit 463, or by increasing the amplification rate by which the vertical differential amplifier circuit 461 amplifies the signal difference between the output terminals of the vertical hall element hv10.

In the case where the second amplification rate in the vertical subtracting amplifier circuit 463 is increased, values of the second and fourth vertical resistors R28 and R30 are set larger than those of the first and third vertical resistors R27 and R29.

Figure 10:
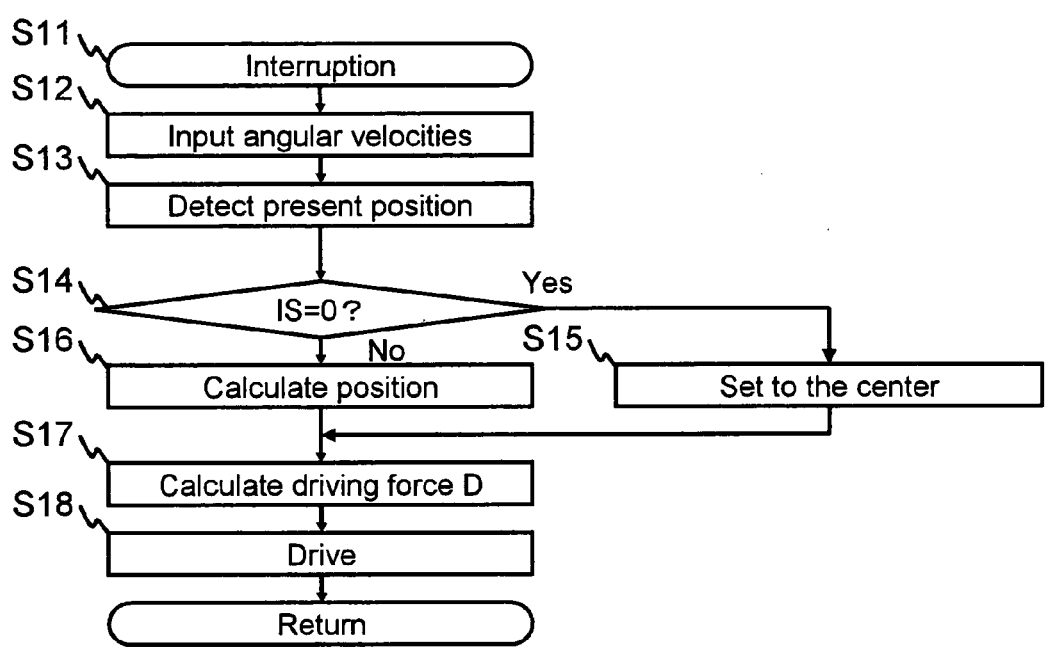
FIG. 10 is a flowchart of the anti-shake operation, which is performed at every predetermined time interval, as an interruption process.

Next, the flow of the anti-shake operation, which is performed at every predetermined time interval (1 ms) as an interruption process, independently of the other operations, is explained by using the flowchart in FIG. 10.

In step S11, the interruption process for the anti-shake operation is started. In step S12, the first angular velocity vx, which is output from the angular velocity detecting unit 25, is input to the A/D converter A/D 0 of the CPU 21 and is converted to a digital signal. The second angular velocity vy, which is output from the angular velocity detecting unit 25, is input to the A/D converter A/D 1 of the CPU 21 and is converted to a digital signal.

In step S13, the position of the movable unit 30$a$ is detected by the hall element unit 44$a$, so that the first detected-position signal px, which is calculated by the hall-element signal-processing unit 45, is input to the A/D converter A/D 2 of the CPU 21 and is converted to a digital signal (pdx), and the second detected-position signal py, which is calculated by the hall-element signal-processing unit 45, is input to the A/D converter A/D 3 of the CPU 21 and is converted to a digital signal (pdy). Therefore, the present position of the movable unit 30$a$ P (pdx, pdy) is determined.

In step S14, it is judged whether the value of the IS is 0. When it is judged that the value of the IS is 0 (IS=0), in other words in the non anti-shake mode, the position S (sx, sy) of the movable unit 30$a$ (the imaging unit 39$a$), which should be moved to, is set to the center of the movement range of the movable unit 30$a$, in step S15. When it is judged that the value of the IS is not 0 (IS=1), in other words in the anti-shake mode, the position S (sx, sy) of the movable unit 30$a$ (the imaging unit 39$a$), which should be moved to, is calculated on the basis of the first and second angular velocities vx and vy, in step S16.

In step S17, the driving force D, which drives the driver circuit 29 in order to move the movable unit 30$a$ to the position S, in other words the first PWM duty dx and the second PWM duty dy, is calculated on the basis of the position S (sx, sy), which is determined in step S15 or step S16, and the present position P (pdx, pdy).

In step S18, the first driving coil unit 31$a$ is driven by using the first PWM duty dx through the driver circuit 29, and the second driving coil unit 32$a$ is driven by using the second PWM duty dy through the driver circuit 29, so that the movable unit 30$a$ is moved.

The process in steps S17 and S18 is an automatic control calculation, which is used with the PID automatic control for performing general (normal) proportional, integral, and differential calculations.

In this embodiment, the first position-detecting and driving magnet 411$b$ is a one body in order to detect the first location in the first direction x of the movable unit 30a and drive the movable unit 30a in the first direction x, however a magnet for detecting the first location and a magnet for driving the movable unit 30a in the first direction x, may be separated.

Similarly, the second position-detecting and driving magnet 412b is a one body in order to detect the second location in the second direction y of the movable unit 30a and drive the movable unit 30a in the second direction y, however a magnet for detecting the second location and a magnet for driving the movable unit 30a in the second direction y, may be separated.

Further, it is explained that the hall element unit 44a is attached to the movable unit 30a and the position-detecting magnets (the first and second horizontal position-detecting and driving magnets 411b1 and 411b2, and the first and second vertical position-detecting and driving magnets 412b1 and 412b2) are attached to the fixed unit 30b, however the hall element unit may be attached to the fixed unit and position-detecting magnets are attached to the movable unit.

The magnet, which generates a magnetic-field, is a permanent magnet which always generates the magnetic-field.

Further, it is explained that the movable unit 30a has the imaging device 39a1. However, the movable unit 30a may have a hand-shake correcting lens instead of the imaging device.

Further, moving the movable unit 30a is not limited by the electromotive force by the coil and the magnet.

Further, it is explained that the hall element is used for position-detecting as the magnetic-field change-detecting element, however, another detecting element may be used for position-detecting. Specifically, the detecting element may be an MI (Magnetic Impedance) sensor, in other words a high-frequency carrier-type magnetic-field sensor, or a magnetic resonance-type magnetic-field detecting element, or an MR (Magneto-Resistance effect) element. When one of the MI sensor, the magnetic resonance-type magnetic-field detecting element, and the MR element is used, the information regarding the position of the movable unit can be obtained by detecting the magnetic-field change, similar to using the hall element.

Further, it is explained that the position-detecting operation of the movable unit for the anti-shake apparatus is performed. However, the position-detecting operation may be performed for a position-detecting apparatus other than a position-detecting apparatus of the anti-shake apparatus.

Further, it is explained that the position-detecting operation is performed in both the first direction x and the second direction y (in two dimensions). However, the position-detecting operation may be performed only in the first direction x (in one direction).

In this case, movable unit may be movable only in the first direction x (not the second direction y), so that the parts regarding the movement of the movable unit in the second direction y and regarding the position-detecting operation of the movable unit in the second direction y, such as the vertical hall element hv10 etc., may be omitted (see FIG. 3 etc.).

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2004-053127 (filed on Feb. 27, 2004), which is expressly incorporated herein by reference, in its entirety.

The invention claimed is:

1. An anti-shake apparatus of a photographing apparatus, comprising:

a movable unit that has one of an imaging device and a hand-shake correcting lens, and that can be moved in first and second directions, said first direction being perpendicular to an optical axis of a photographing lens of said photographing apparatus, and said second direction being perpendicular to said optical axis and said first direction; and a fixed unit that slidably supports said movable unit in both said first and second directions;

one of said movable unit and said fixed unit having a magnetic-field change-detecting unit which has a horizontal magnetic-field change-detecting element for detecting a first location in said first direction of said movable unit, and a vertical magnetic-field change-detecting element for detecting a second location in said second direction of said movable unit;

another of said movable unit and said fixed unit having a position-detecting magnet unit which is used for detecting said first and second locations, and which faces said magnetic-field change-detecting unit, and which has first and second horizontal position-detecting magnets and first and second vertical position-detecting magnets;

the N pole and S pole of said first horizontal position-detecting magnet being arranged in a third direction which is parallel to said optical axis and is perpendicular to said first and second directions;

the N pole and S pole of said second horizontal position-detecting magnet being arranged in said third direction;

the polarities of said first and second horizontal position-detecting magnets being arranged in opposite directions, in said third direction;

said N pole of said first horizontal position-detecting magnet and said S pole of said second horizontal position-detecting magnet being separated in said first direction by a first distance, and facing said horizontal magnetic-field change-detecting element;

said first and second horizontal position-detecting magnets being used for detecting said first location;

the N pole and S pole of said first vertical position-detecting magnet being arranged in said third direction;

the N pole and S pole of said second vertical position-detecting magnet being arranged in said third direction;

the polarities of said first and second vertical position-detecting magnets being arranged in opposite directions, in said third direction;

said N pole of said first vertical position-detecting magnet and said S pole of said second vertical position-detecting magnet being separated in said second direction by a second distance, and facing said vertical magnetic-field change-detecting element; and said first and second vertical position-detecting magnets being used for detecting said second location.

2. The anti-shake apparatus according to claim 1, wherein said position-detecting magnet unit has a first spacer between said first and second horizontal position-detecting magnets, for spacing at said first distance, and a second spacer between said first and second vertical position-detecting magnets, for spacing at said second distance; and said first and second spacers are made of a non-magnetic material.

3. The anti-shake apparatus according to claim 1, wherein said horizontal magnetic-field change-detecting element is located at a place on said magnetic-field change-detecting unit which faces an intermediate area between said first and second horizontal position-detecting magnets in said first direction, and said vertical magnetic-field change-detecting element is located at a place on said magnetic-field change-detecting unit which faces an intermediate area between said first and second vertical position-detecting magnets in said second direction, when a center of one of said imaging device and said hand-shake correcting lens which is included in said movable unit, passes through said optical axis.

4. The anti-shake apparatus according to claim 1, wherein a value of a first predetermined voltage which is applied to the input terminals of said horizontal magnetic-field change-detecting element, is increased in comparison with when said first and second horizontal position-detecting magnets are in contact with each other; and a value of a second predetermined voltage which is applied to the input terminals of said vertical magnetic-field change-detecting element, is increased in comparison with when said first and second vertical position-detecting magnets are in contact with each other.

5. The anti-shake apparatus according to claim 1, wherein a value of a first amplification rate which amplifies a horizontal potential-difference between the output terminals of said horizontal magnetic-field change-detecting element for detecting said first location, is increased in comparison with when said first and second horizontal position-detecting magnets are in contact with each other; and a value of a second amplification rate which amplifies a vertical potential-difference between the output terminals of said vertical magnetic-field change-detecting element for detecting said second location, is increased in comparison with when said first and second vertical position-detecting magnets are in contact with each other.

6. The anti-shake apparatus according to claim 5, further comprising a magnetic-field change-detecting signal processing unit which has a horizontal magnetic-field change-detecting signal processing circuit and a vertical magnetic-field change-detecting signal processing circuit;

said horizontal magnetic-field change-detecting signal processing circuit having a horizontal subtracting amplifier circuit which detects a first detected-position signal for specifying said first location, by using a calculation including a multiplication of said horizontal potential-difference by said first amplification rate; and said vertical magnetic-field change-detecting amplifier circuit which detects a second detected-position signal for specifying said second location, by using a calculation including a multiplication of said vertical potential-difference by said second amplification rate.

7. The anti-shake apparatus according to claim 6, wherein said horizontal magnetic-field change-detecting signal processing circuit has a horizontal differential amplifier circuit which amplifies a first signal difference between said output terminals of said horizontal magnetic-field change-detecting element;

said vertical magnetic-field change-detecting signal processing circuit has a vertical differential amplifier circuit which amplifies a second signal difference between said output terminals of said vertical magnetic-field change-detecting element;

said horizontal subtracting amplifier circuit calculates said horizontal potential-difference on the basis of a difference between said amplified first signal difference and a reference voltage; and said vertical subtracting amplifier circuit calculates said vertical potential-difference on the basis of a difference between said amplified second signal difference and said reference voltage.

8. The anti-shake apparatus according to claim 7, wherein said horizontal differential amplifier circuit has first and second horizontal operational amplifiers;

said horizontal subtracting amplifier circuit has a third horizontal operational amplifier, and first, second, third, and fourth horizontal resistors;

said vertical differential amplifier circuit has first and second vertical operational amplifiers;

said vertical subtracting amplifier circuit has a third vertical operational amplifier, and first, second, third, and fourth vertical resistors;

an output terminal of said first horizontal operational amplifier is connected with an inverting input terminal of said third horizontal operational amplifier through said first horizontal resistor;

an output terminal of said third horizontal operational amplifier is connected with said inverting input terminal of said third horizontal operational amplifier through said second horizontal resistor;

an output terminal of said second horizontal operational amplifier is connected with a non-inverting input terminal of said third horizontal operational amplifier through said third horizontal resistor;

said non-inverting input terminal of said third horizontal operational amplifier is connected with said reference voltage through said fourth horizontal resistor;

an output terminal of said first vertical operational amplifier is connected with an inverting input terminal of said third vertical operational amplifier through said first vertical resistor;

an output terminal of said third vertical operational amplifier is connected with said inverting input terminal of said third vertical operational amplifier through said second vertical resistor;

an output terminal of said second vertical operational amplifier is connected with a non-inverting input terminal of said third vertical operational amplifier through said third vertical resistor;

said non-inverting input terminal of said third vertical operational amplifier is connected with said reference voltage through said fourth vertical resistor;

said first amplification rate is increased on the basis that the values of said first and third horizontal resistors are the same, and the values of said second and fourth horizontal resistors are the same and larger than those of said first and third horizontal resistors; and said second amplification rate is increased on the basis that the values of said first and third vertical resistors are the same, and the values of said second and fourth vertical resistors are the same and larger than those of said first and third vertical resistors.

9. The anti-shake apparatus according to claim 1, wherein said movable unit has said magnetic-field change-detecting unit, and said fixed unit has said position-detecting magnet unit.

10. The anti-shake apparatus according to claim 9, wherein said first and second horizontal position-detecting magnets are used for moving said movable unit in said first direction, and said first and second vertical position-detecting magnets are used for moving said movable unit in said second direction.

11. The anti-shake apparatus according to claim 1, wherein said magnetic-field change-detecting unit is a one-axis hall element; and said horizontal magnetic-field change-detecting element and said vertical magnetic-field change-detecting element are hall elements.

12. A position-detecting apparatus, comprising:
a movable unit that has can be moved in a first direction; and
a fixed unit that slidably supports said movable unit in said first direction;
one of said movable unit and said fixed unit having a magnetic-field change-detecting unit which has a magnetic-field change-detecting element for detecting a first location in said first direction of said movable unit;
another of said movable unit and said fixed unit having a position-detecting magnet unit which is used for detecting said first location, and which faces said magnetic-field change-detecting unit, and which has first and second position-detecting magnets;
the N pole and S pole of said first position-detecting magnet being arranged in a second direction which is perpendicular to said first direction;
the N pole and S pole of said second position-detecting magnet being arranged in said second direction;
the polarities of said first and second position-detecting magnets being arranged in opposite directions, in said second direction;
said N pole of said first position-detecting magnet and said S pole of said second position-detecting magnet being separated in said first direction by a first distance, and facing said magnetic-field change-detecting element; and
said first and second position-detecting magnets being used for detecting said first location.

13. The position-detecting apparatus according to claim 12, wherein a value of a predetermined voltage which is applied to the input terminals of said magnetic-field change-detecting element, is increased in comparison with when said first and second position-detecting magnets are in contact with each other.

14. The position-detecting apparatus according to claim 12, wherein a value of a amplification rate which amplifies a potential-difference between the output terminals of said magnetic-field change-detecting element for detecting said first location, is increased in comparison with when said first and second position-detecting magnets are in contacted with each other.

15. The position-detecting apparatus according to claim 14, further comprising a magnetic-field change-detecting signal processing unit which has a magnetic-field change-detecting signal processing circuit;
said magnetic-field change-detecting signal processing circuit having a subtracting amplifier circuit which detects a first detected-position signal for specifying said first location, by using a calculation including a multiplication of said potential-difference by said amplification rate.

* * * * *